Figure 1:
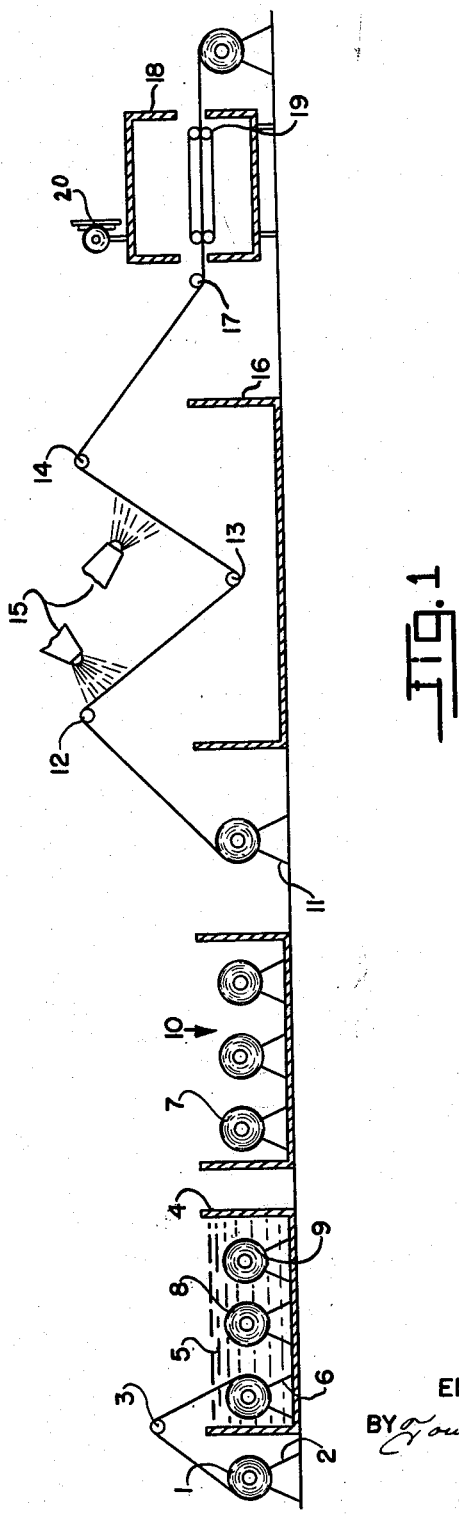

Jan. 19, 1954     E. H. BALZ     2,666,720
METHOD OF REMOVING STARCH FROM THE BINDER ON GLASS CLOTH
Filed May 28, 1951     2 Sheets-Sheet 1

INVENTOR
EMIL H. BALZ
BY *Toulmin & Toulmin*
ATTORNEYS

Jan. 19, 1954     E. H. BALZ     2,666,720
METHOD OF REMOVING STARCH FROM THE BINDER ON GLASS CLOTH
Filed May 28, 1951     2 Sheets-Sheet 2

INVENTOR
EMIL H. BALZ
BY
Toulmin & Toulmin
ATTORNEYS

Patented Jan. 19, 1954

2,666,720

UNITED STATES PATENT OFFICE 2,666,720

METHOD OF REMOVING STARCH FROM THE BINDER ON GLASS CLOTH

Emil H. Balz, Waterville, Ohio, assignor to Glass Fibers, Inc., Waterville, Ohio, a corporation of Ohio Application May 28, 1951, Serial No. 228,625

10 Claims. (Cl. 134—2)

This invention relates to glass cloth. More particularly the invention relates to a treatment for glass cloth to render the same useful in the making of laminations with resinous materials.

In the production of glass cloth the glass composition is first made molten and caused to flow from extremely small orifices from which it is picked up by a revolving drum or an air or high pressure steam blast and pulled into long fine fibers. The individual fiber is smooth, substantially cylindrical and normally has a diameter of about .00021 to .00040 inch. The fibers may then be grouped in such fashion as to form a thread of parallel fibers and thereafter a group of the continuous fibers is sent on to the textile machines for weaving into cloth.

In order to minimize friction in processing the fibers while they are being drawn out are treated with a water dispersion of a lubricant of binder material prior to formation of the groups. This binder material, which generally consists of a vegetable lubricating oil, starch and very small amounts of cationic, wetting and dispersing agents, etc. coats the fibers and remains thereon in the finished glass cloth. This binder is present to the extent of about 1.5% to 2.0% by weight on the dry finished glass cloth.

The presence of this binder aids in the textile operation but seriously affects the ability of the glass to form laminates with other materials, such as synthetic resins. Accordingly when it is desired to form such laminates treatment of the glass cloth to remove the binder material is required in order to obtain satisfactory adhesions between the cloth and the resin.

Further it is frequently desirable to ascertain percentages of oil and starch in a given binder material to determine the application to which a given glass fabric is suitable.

Present known methods for the removal of the binder require among other steps the treatment of the cloth at temperatures of the order of 600° F. to 700° F. for prolonged periods, generally 55 to 60 hours. Such methods, of course, seriously hinder production, require an excessive amount of equipment for a given production, and in the overall are exceedingly expensive.

The present invention provides a new and improved method for determining the percentages of oil and starch in a given binder material.

The present invention contemplates the provision of a novel method for the removal of the starch of the binder material of glass cloth.

The invention further contemplates a method of providing a scrupulously clean glass cloth surface particularly suitable for combining with resinous compositions.

The invention also contemplates the provision of a production method for the cleaning of the glass cloth which eliminates the necessity for large storage space requirements during the processing steps.

I have found that these and other objects of the invention may be attained by treating the glass cloth containing the oil-starch binder material with a solution of urea at moderate temperatures. The starch and other agents of the binder are thereby removed from the glass fabric which retains the oil component of the binder thereon. Thereafter the oil may be removed from the fabric to provide a thoroughly clean glass by (a) the use of a caustic treatment as described in my co-pending application, Serial No. 228,623, filed May 28, 1951, or (b) by the use of an oxidizing agent as described in my co-pending application, Serial No. 228,624, filed May 28, 1951, or (c) by a batch operation, or (d) by treatment in an autoclave with air or oxygen under pressure.

In the practice of the invention the glass cloth containing the starch and oil binder is soaked for about a half hour in water solution of urea having a concentration of about 5 to 20 percent and containing wetting and detergent agents. These agents are used to lower the surface tension of the urea and permit the same to thoroughly wet the glass fabric and accordingly act to shorten the time of treatment. Heating the urea solution is also of assistance in penetration of the binder material.

The water dispersible constituents of the binder, including the small amounts of wetting and detergent components present therein, and the starch, are substantially completely removed by the action of the urea solution leaving the oil component of the binder on the glass. Any small amount of these substances remaining on the glass, with the exception of the oil and the cationic agent, may be then completely removed by washing the cloth with hot water.

The oil constituent of the binder as set forth in this application, unless otherwise specifically indicated, will be understood to include also the cationic agent which serves to retain the oil on the fabric. Since the quantity of this agent is very small it will not materially affect the process.

Thus this method of cleaning the glass provides a facile procedure for the determination of the quantity of oil in a given binder material for the oil, as noted hereinbefore, may then be readily removed from the glass cloth by treatment with a strong alkali such as sodium hydroxide or a strong oxidizing agent as potassium chlorate, and thereafter exposing the cloth to moderate temperatures, or if preferred the oil may be removed by treatment of the cloth with oxygen or air under pressure in an autoclave.

The treatment of invention is adaptable to all oil-starch binder materials and in substantially all proportions of these components. The oil of the binder is generally a lubricating oil of vegetable origin, such as castor, hydrogenated cottonseed, olive and coconut. Highly unsaturated oils due to their instability to light are not usually employed in the lubrication of fibers for glass cloth manufacture, but if so employed under selected conditions would also be removable from such cloth by the process of invention. The starch of the binder may be any of the normal starches of commerce and may include the slightly hydrolyzed or dextrinized materials. In addition to these primary components, one or more substances such as gelatin, borax, polyvinyl alcohol or wetting and dispersing compounds are normally used in the binder to facilitate application thereof to the cloth during manufacture and are readily removed from the cloth by action of the urea.

The cationic agent employed in the binder will however, as noted hereinbefore, remain on the cloth with the oil after treatment with the urea, and will be subsequently removed with the oil by ignition processes.

The concentration of the urea may vary from 5 to 20 percent, a concentration of 5 to 10 percent water solution in general being satisfactory. The more concentrated solutions, while faster acting, are limited in their use due primarily to cost considerations.

Wetting and detergent agents which may suitably be employed in the urea solution include Triton N-100, a product of Rohm and Haas Company which is a concentrated wetting agent and detergent designed primarily for use in the textile trade. Such an agent assists in the wetting and penetration of the binder which is of itself somewhat water repellent due to the oil content and shortens the time required for action of the urea. Triton N-100 is an aryl alkyl polyether alcohol soluble in all proportions in cold water and in most organic compounds. Other wetting and detergent agents having similar properties may be satisfactorily employed.

Figure 2:
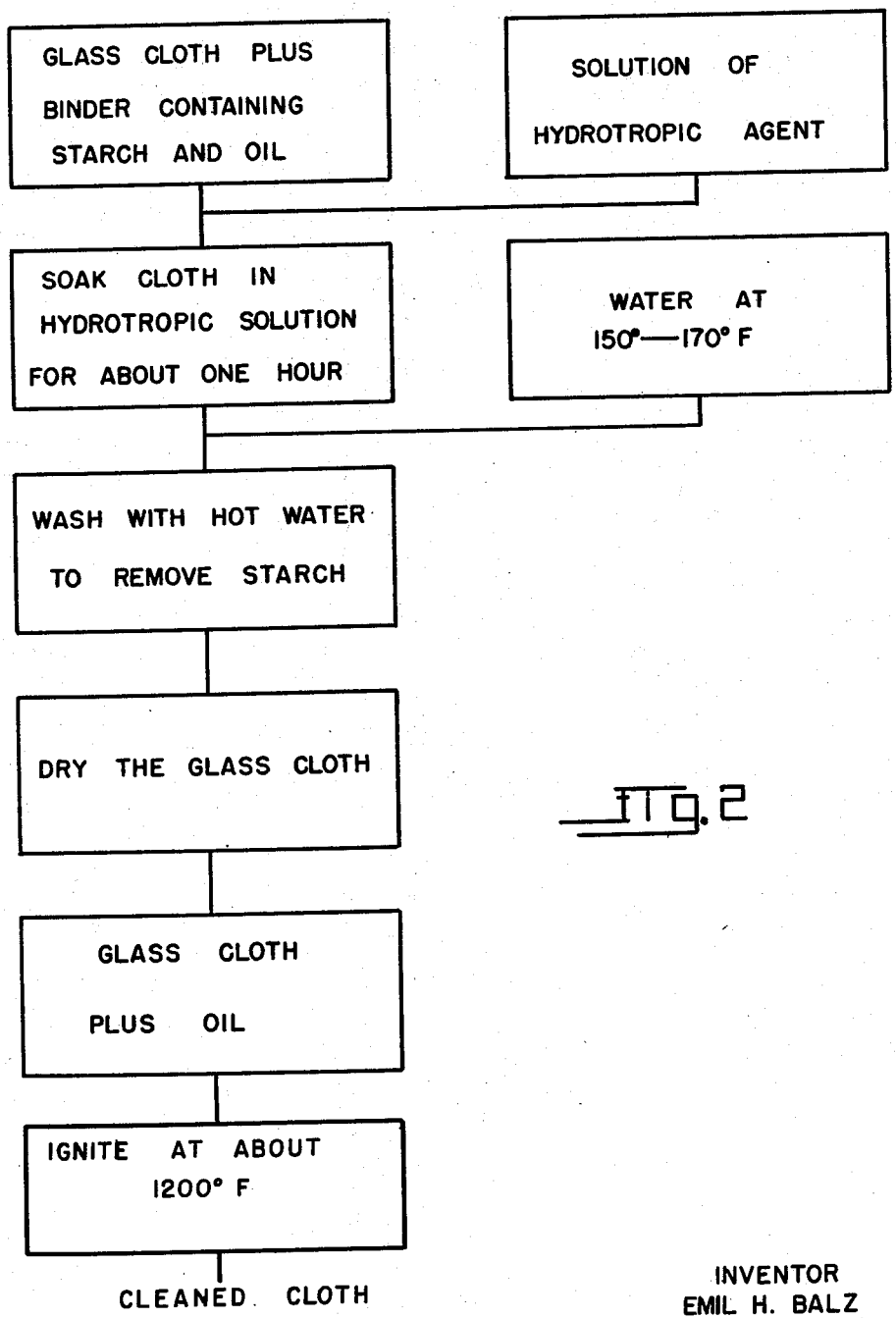

The invention will be more fully understood by reference to the following detailed descripton and appended drawing wherein:

Figure 1 is a diagrammatic representation of apparatus used in the preferred embodiment of the invention; and Figure 2 is a flow sheet illustrating the process of the invention.

Referring to Figure 1, there is shown a roll of glass cloth 1 produced from standard "E" glass, the fibers of which during manufacture were treated with an aqueous binder material consisting by weight of about 2% of hydrogenated cottonseed oil (Pureco), about 8% of partially dextrinized starch (Globe Gum), about .06% of gelatin, about .13% of polyvinyl alcohol, about .2% of Tween 81 (partial esters of fatty acids and hexitolanhydrides combined with polyoxyethylene chains), about .4% of onyx cation X (fatty imadazoline derivative), the balance being water and a very small amount of borax to bring the pH of the dispersion into the range of 6.0 to 6.6. This binder material, minus the water content, is present to the extent of about 1.8% by weight on the dry glass cloth roll shown at 1.

The roll of glass cloth 1 is shown mounted upon a stand 2 and may be appropriately unreeled and passed over an idler roller 3, into a tank 4 containing a 10% aqueous solution of urea, indicated generally at 5. This solution also contains approximately .05 to 0.1 of 1% by weight of the solution of Triton N-100 (an aryl alkyl polyether alcohol soluble in all proportions in cold water and in most organic compounds) and is maintained at a temperature of about 175° to 195° F. The cloth is rerolled in the solution on stand 6 and permitted to soak for about one-half hour, whereupon it is removed from the urea solution and stored as at 7 to await further processing.

It is clear that a number of rolls may be subjected to the action of the urea at one time as indicated at 8, 9 and that a small storage space indicated generally at 10 will accommodate a considerable number of treated rolls.

The urea-treated roll may preferably immediately after the steeping operation, or on removal from the temporary storage at 10, be mounted on a reel 11 from which it is unwound and passed continuously over rolls 12, 13 and 14 and under water sprays indicated generally at 15. This wash water has a preferred temperature in the range of 150° F. to 170° F. and effectively removes all traces of starch, gelatin, polyvinyl alcohol, etc. which may remain after the urea treatment. The well known iodine test for starch may be employed to determine whether the starch has been completely removed by the wash water, an end point which with the oil-starch binder materials under consideration, will be attained in a matter of a few minutes of washing. Any or all of the rolls over which the cloth passes may be driven and the speed of operation for a given production arrangement may be readily determined to permit complete continuous washing. A shallow pan 16 beneath the sprays directs spent waste water to drainage or alternatively the spray 5 may be provided with wash solution from tank 5 in which case the solution is recirculated for reasons of economy. A combination of a urea solution spray followed by a water spray may be effectively employed.

The washed cloth containing only the oil and cationic constituents of the binder is then passed under a spreader roll 17 and dried in oven 18 at a temperature of about 200° F. to 300° F. Upon leaving the oven the roll of glass cloth is wound on a reel as shown at 19. This roll may then be treated as described in my co-pending applications referred to hereinbefore, to remove the oil including the cationic agent and provide a perfectly clean glass cloth useful for laminations with resinous materials.

Briefly this method consists of treating the cloth containing the oil with a strong alkali such as .1 of 1% of sodium hydroxide and a pH of about 11 to 13, and after removal of the excess of alkali the oil may be burned from the cloth by subjecting the same to temperatures in the range of 650° F. to 750° F. for approximately one minute, after which any slight discoloration on the cloth may be completely removed therefrom by treatment with a 1% sodium hypochlorite solution and the cloth then again washed. After drying the cloth will be thoroughly cleansed and the loss of weight by these latter operations will represent the amount of oil in the original binder.

The cleaned cloth is then in a very satisfactory condition for lamination with resinous substances in the manner known to the art.

It will be clear that by drying and weighing the roll of cloth prior to the start of the described treatment and again after drying in oven 18, that the quantity of starch plus the other water dispersible constituents of the binder may be readily determined. Also by weighing after oil removal, the oil content of the roll may be derived. Such determinations may also, of course, be made on a laboratory sample of 5 to 10 grams of cloth where very accurate quantitative results are required. In this case the oil may also be removed by simple ignition at about 1200° F.

It will be noted that not only does the method of the present invention provide a process for the quantitative determination of the starch and oil constituents of the binder, but also provides a method which materially reduces the time cycle for the cleaning of a roll of glass cloth as presently practiced in production. Thus the urea treatment requires an hour or less and the washing only a matter of minutes. Since the alkali or oxidizing treatment described fully in the co-pending applications referred to above for the removal of the oil will require less than three hours, it is readily seen that the whole process of the complete cleaning may be carried out in less than five hours, a material improvement over the several days now customary in the art.

Further the present invention is adapted to production methods that eliminate the tie-up of expensive equipment and space inherent to the present production methods.

All glass compositions suitable for use in glass fabrics may be treated by the process of invention and no decrease in the strength of the fabric is occasioned thereby.

Further the treatment of invention similarly to the alkali and oxidizing treatments set forth in my co-pending applications results in a smoother and softer fabric than the prior art processes provide.

It will be understood that this invention is susceptible to modification in order to adopt it to different usages and conditions and accordingly, it is desired to comprehend such modifications within this invention as may fall within the scope of the appended claims.

I claim:

1. In a process for the removal of hydrophilic materials from a binder on glass cloth the step of soaking the glass cloth in an aqueous solution of urea.

2. In a process for the removal of hydrophilic materials from a binder on glass cloth the steps of soaking the glass cloth in an aqueous solution of urea, and washing the cloth to remove all traces of the hydrophilic materials.

3. In a process for the removal of starch from an oil-starch binder on glass cloth, the step of soaking the glass cloth in an aqueous solution containing 5 to 20 percent by weight of urea.

4. In a process for the removal of starch from an oil-starch binder on glass cloth, the steps of soaking the glass cloth in a 5 to 20 percent aqueous solution of urea at temperatures in the range of 170° F. to 190° F., and thereafter washing the glass cloth with hot water.

5. In a process for the removal of starch from an oil-starch binder on glass cloth, the steps of soaking the glass cloth in an aqueous solution of urea containing a wetting and detergent agent.

6. In a process for the removal of starch from an oil-starch binder on glass cloth, the steps of soaking the cloth for about one-half hour in a 5-20% water solution of urea containing a wetting and detergent agent, the temperature of said solution being in the range of 170° to 190° F., and thereafter washing the glass cloth with hot water.

7. A process for the removal of oil-starch binder material from glass cloth comprising the steps of soaking the glass cloth in a 5-20% water solution of urea at temperatures in the range of 170-190° F. to remove the starch of the binder, and thereafter heating the cloth at a temperature of about 1200° F. to remove the oil constituent of the binder from the glass cloth.

8. A process for the quantitative determination of the oil in a binder on glass cloth which binder contains oil, starch and water dispersibles, comprising the steps of weighing the cloth with the binder thereon, steeping the cloth in an aqueous solution containing 5-20% by weight of urea to remove the starch and water dispersibles from the binder, drying the cloth, thereafter weighing the cloth containing the oil constituent, igniting the portion of the binder remaining on the cloth to burn off the oil constituent, and again weighing the cloth.

9. A process for the removal of starch from an oil-starch binder on glass cloth comprising the steps of soaking the glass cloth with an aqueous solution containing a urea and a wetting agent at a temperature in the range of about 170° F. to 190 F. for about one-half hour, and thereafter washing the cloth with warm water.

10. A process for the removal of starch from an oil-starch binder on glass cloth, comprising the steps of soaking the glass cloth in an aqueous solution containing approximately 10% by weight of urea, and thereafter washing the glass cloth with water at a temperature of about 150° F. to 170° F.

EMIL H. BALZ.

References Cited in the file of this patent

UNITED STATES PATENTS

| Number | Name | Date |
|---|---|---|
| 2,407,483 | Ebaugh | Sept. 10, 1946 |
| 2,607,359 | Oesting | Aug. 19, 1952 |